Patented Mar. 19, 1946

2,397,019

UNITED STATES PATENT OFFICE 2,397,019

PRINTING INK

John W. Kroeger and Harry F. O'Connor, Philadelphia, Pa., assignors to Fred'k H. Levey Co., Inc., New York, N. Y., a corporation of New York No Drawing. Application December 1, 1941, Serial No. 421,248

10 Claims. (Cl. 260—30)

This invention relates to printing inks and particularly to inks which may be dried rapidly in the form of printed films by the application of heat.

Quick-drying printing inks have been prepared heretofore by dissolving solid or viscous resins in a suitable solvent and suspending the desired pigments in the vehicle thus prepared. Drying of such inks depends upon the application of heat to the printed material in order to vaporize the solvent. The solvents employed must be carefully selected with reference to boiling point and vapor pressure in order to afford a suitable balance between the speed with which the ink will dry and the time during which it will remain sufficiently fluid on the ink distributing system and printing plates of the printing press. Since the solvent is removed by the application of heat, it is usually necessary to provide means for withdrawing the vaporized solvent from the atmosphere adjacent the printing press and even to install a solvent recovery system. These necessary precautions add to the cost of the operation.

Another difficulty encountered in the use of inks employing volatile solvents is the tendency of films of synthetic resins to retain small amounts of solvents after heat has been applied and the film is apparently dry. This frequently leads to serious smearing of one printed side of a sheet if the sheet is immediately subjected to printing on the reverse side or is otherwise treated following the printing and drying operation.

It is the object of the present invention to provide printing inks which will dry rapidly in the form of printed films when subjected to heat at relatively low temperatures without the evolution of volatilized solvents.

A further object of the invention is the provision of a printing ink having good press stability so that premature drying is avoided, which nevertheless can be dried rapidly at high press speeds by the application of heat.

Another object of the invention is the provision of a printing ink which, after drying, will not re-soften when printed impressions are applied to the reverse side of the sheet.

Other objects and advantages of the invention will be apparent as it is better understood by reference to the following specification, in which the preferred embodiments are described.

In a co-pending application Serial No. 419,604, filed November 18, 1941, we have described the preparation of stable, non-resinous, thermo-setting liquid products by reacting phenolic compounds with formaldehyde in the presence of an alkaline catalyst, thereafter neutralizing the alkaline catalyst and converting the unreacted formaldehyde into a non-reactive compound. A variety of liquid products of relatively low viscosities ranging between 200 and 20,000 centipoises at 30° C. can be prepared by selecting suitable phenolic compounds and subjecting them to treatment by the methods disclosed in the aforesaid application. We may use phenol and its homologues and derivatives including p-ter. butylphenol, m-cresol and 1,3,5-xylenol as well as other phenolic compounds which are subject to condensation with formaldehyde. The initial condensation product produced by heating the selected phenolic compound at relatively low temperature, preferably between 55 and 85° C. for periods varying from 1 to 2½ hours may be neutralized with a weak acid such as lactic, glycolic, acetic or benzoic acid and then treated with a sulphite, bisulphite, or meta-bisulphite of an alkali or an alkaline earth metal in either the anhydrous or the hydrated form to remove the unreacted formaldehyde. The organic layer is separated if water is present in the reaction and filtered to remove any solid constituents. If further dehydration is necessary, the product may be heated in a vacuum for a sufficient period to remove the water present. Products prepared as described are oily liquids which remain stable for extended periods under ordinary storage conditions and may be utilized as vehicles for pigments. Since a variety of products having differing viscosities can be prepared, such products can be mixed to produce vehicles of the desired viscosity.

The products as described are particularly desirable as vehicles for printing inks. They do not dry under ordinary atmospheric conditions or those which are normally present in a pressroom, and consequently do not harden or become gummy on the ink distributing system of a printing press or on the printing plates. Nevertheless, when films in the form of printed impressions are subjected to relatively low temperatures, for example from 300 to 350° F., the vehicles produced as described dry in a relatively few seconds and do not again soften. Consequently the printed impressions do not smear upon the application of second side printing or other treatment to which the printed sheet may be subjected. Drying is effected without vaporization of a solvent, and fumes arising from such vaporization are therefore avoided. The principal vapor produced is the small amount of water which may be released during the reaction which occurs upon the application of heat to the vehicle.

In the formulation of inks embodying the invention, any suitable pigment compatible with the vehicle can be employed. There is a large variety of such pigments available and an enumeration of them is unnecessary. Most of the pigments commonly employed in printing inks can be utilized. Toners may be used as an ordinary practice.

Since the density of printing ink pigments varies widely, proportions of pigment to the vehicle in terms of weight will likewise vary over a wide range. In general, we find that from 10 to 66% of pigment by weight may be combined with from 34% to 90% of the phenol-formaldehyde condensate. The latter term is employed hereafter and in the claims submitted herewith in the inclusive sense to cover both condensates of phenol and of its homologues and derivatives with formaldehyde.

In certain formulations it may be desirable to add small amounts of urea-formaldehyde resins or equivalent resins which tend to reduce penetration of the ink into the paper. From 2 to 8% by weight of the total weight of the ink may be included as resins. When such resins are used, they are dispersed in the phenol-formaldehyde condensate before the addition of the pigment and other ingredients of the ink.

Also in some formulations it may be desirable to add small quantities of polyhydric alcohols such as ethylene glycol, diethylene glycol or glycerol. The polyhydric alcohols improve the stability of the inks in storage. We have found that addition of such alcohols to the extent of from 2 to 15% by weight of the total weight of the ink is sometimes desirable.

It is customary to add small amounts of waxes in ink formulations and in certain instances we have added from 0.5 to 2% by weight of the total weight of the ink. Paraffin or ceresin waxes are suitable for use in preparing such ink formulations.

In the following examples which are merely for the purpose of illustration, it should be recognized that the particular pigments specified are not essential, since other pigments can be substituted and that the proportions of the pigment and vehicle will vary depending upon the particular pigment or pigments employed. Likewise, where a particular condensate is specified, other similar condensates prepared in accordance with the disclosure in the aforesaid application may be substituted, or mixtures of such condensates can be used to afford vehicles of the desired viscosity. The speed of drying may be adjusted by employing mixtures of condensates, since the drying time of the several condensates varies with the particular phenolic compound used. Likewise, the proportions of added resin and wax, if such are specified, can be modified, or these elements can be eliminated. It is not necessary to include the polyhydric alcohol, although this material often improves the ink. The proportions stated in the examples are in parts by weight:

*Example I*

| | Parts |
|---|---|
| Alkali blue pigment | 25.00 |
| p-Ter. butylphenol-formaldehyde condensate, viscosity approximately 600 cps. at 33° C | 75.00 |
| | 100.00 |

The mixture is ground in the usual ink mill in the manner well known in the art until the ingredients are thoroughly commingled. The same operation is employed in the examples hereinafter described. The ink as thus prepared is of good working quality and medium body. Printed impressions dry thoroughly in from 2 to 5 seconds when subjected to a temperature of from 325° to 350° F.

*Example II*

| | Parts |
|---|---|
| Chrome Yellow pigment | 50.00 |
| p-Ter. amylphenol-formaldehyde condensate, viscosity approximately 600 cps. at 33° C | 50.00 |
| | 100.00 |

*Example III*

| | Parts |
|---|---|
| Hansa Yellow pigment | 3.40 |
| Chrome Yellow pigment | 32.69 |
| 1,3,5-xylenol-formaldehyde condensate, viscosity 700 cps. at 24° C | 63.00 |
| Paraffin wax | 0.91 |
| | 100.00 |

*Example IV*

| | Parts |
|---|---|
| Hansa Yellow pigment | 3.70 |
| Chrome Yellow pigment | 36.00 |
| Urea-formaldehyde resin | 7.55 |
| p-Ter. butylphenol-formaldehyde condensate, viscosity 635 cps. at 33° C | 42.75 |
| Phenol-formaldehyde condensate, viscosity 166 cps. at 25° C | 10.00 |
| | 100.00 |

*Example V*

| | Parts |
|---|---|
| Carbon Black | 12.90 |
| Milori Blue | 2.10 |
| Methyl Violet | 0.50 |
| 1,3,5-xylenol-formaldehyde condensate, viscosity 420 cps. at 28° C | 20.70 |
| p-Ter. butylphenol-formaldehyde condensate, viscosity 720 cps. at 25° C | 48.30 |
| Diethylene glycol | 13.90 |
| Paraffin wax | 2.00 |
| | 100.00 |

*Example VI*

| | Parts |
|---|---|
| Milori Blue pigment | 35.00 |
| Urea formaldehyde resin | 6.53 |
| Phenol-formaldehyde condensate, viscosity 372 cps. at 33° C | 58.47 |
| | 100.00 |

Example VII

| | Parts |
|---|---|
| Lithol-Rubine Red pigment | 30.00 |
| Urea formaldehyde resin | 2.90 |
| Phenol-formaldehyde condensate, viscosity 540 cps. at 33° C | 66.10 |
| Ceresin wax | 1.00 |
| | 100.00 |

Example VIII

| | Parts |
|---|---|
| Carbon Black | 12.50 |
| Milori Blue | 2.10 |
| Methyl Violet | 0.50 |
| Urea-formaldehyde resin | 5.03 |
| Phenol-formaldehyde condensate, viscosity 372 cps. at 33° C | 77.87 |
| Paraffin wax | 2.00 |
| | 100.00 |

Example IX

| | Parts |
|---|---|
| Carbon Black | 12.50 |
| Milori Blue | 2.10 |
| Methyl Violet | 0.50 |
| Urea-formaldehyde resin | 2.85 |
| Phenol-formaldehyde condensate viscosity 620 cps. at 33.5° C | 80.05 |
| Paraffin wax | 2.00 |
| | 100.00 |

Example X

| | Parts |
|---|---|
| Carbon Black | 11.88 |
| Milori Blue | 1.99 |
| Methyl Violet | 0.48 |
| Urea-formaldehyde resin | 2.71 |
| Phenol-formaldehyde condensate, viscosity 620 cps. at 33.5° C | 76.04 |
| Paraffin wax | 1.90 |
| Diethylene glycol | 5.00 |
| | 100.00 |

Example XI

| | Parts |
|---|---|
| Carbon Black | 12.50 |
| Milori Blue | 2.10 |
| Methyl Violet | 0.50 |
| Urea-formaldehyde resin | 5.50 |
| Phenol-formaldehyde condensate, viscosity 620 cps. at 33.5° C | 79.40 |
| Diethylene glycol | 5.00 |
| Paraffin wax | 2.00 |
| | 100.00 |

The use of the inks described and particularly of a vehicle consisting of a non-resinous, thermo-setting condensation product of a phenolic compound with formaldehyde in the formulation of the ink permits the attainment of higher press speeds, since a relatively small amount of heat will convert the wet ink film quickly into a non-off-setting condition. Further application of heat, as for example in drying the second side printing, simply hardens the film by advancing the resin formation. However, the initial heating of the first side impression converts the material promptly to a resinous and hardened condition so that sheets may be piled, a web may be rolled, or the second side printing operation may be conducted immediately without any danger of smudging the dried impression on the first side. The ink affords, therefore, an important improvement in the printing operation where quick drying has depended heretofore upon the use of volatile solvents in the ink formulation with the inherent disadvantage that such solvents must be vaporized and as vapor must be withdrawn from the atmosphere in order to avoid toxic and other hazards.

Various changes may be made in the compositions of the inks as hereinbefore indicated, without departing from the invention as sacrificing any of the advantages thereof.

We claim:

1. A printing ink comprising a pigment and a vehicle therefor, the vehicle consisting essentially of a non-resinous, thermo-setting liquid condensate of a phenolic compound from the class consisting of monohydroxy benzene and its carbon alkylated products with formaldehyde, said liquid vehicle maintaining its liquidity and chemical composition on standing at normal temperatures, but resinifying into a solid resin when heated to elevated temperatures.

2. A printing ink comprising a pigment and a vehicle therefor, the vehicle consisting essentially of a non-resinous, thermo-setting liquid condensate of a phenolic compound from the class consisting of monohydroxy benzene and its carbon alkylated products with formaldehyde having a viscosity approximately between 200 and 20,000 centipoises at 30° C., said liquid vehicle maintaining its said viscosity and its chemical composition on standing at normal temperatures, but resinifying into a solid resin when heated to elevated temperatures.

3. A printing ink comprising a pigment and a vehicle therefor, the vehicle consisting essentially of a mixture of non-resinous, thermo-setting liquid condensates of phenolic compounds from the class consisting of monohydroxy benzene and its carbon alkylated products with formaldehyde, said liquid vehicle maintaining its liquidity and chemical composition on standing at normal temperatures, but resinifying into a solid resin when heated to elevated temperatures.

4. A printing ink comprising a pigment and a vehicle therefor, the vehicle consisting essentially of a non-resinous, thermo-setting liquid condensate of a phenolic compound from the class consisting of monohydroxy benzene and its carbon alkylated products with formaldehyde having a resin dispersed therein, said liquid vehicle maintaining its liquidity and chemical composition on standing at normal temperatures, but resinifying into a solid resin when heated to elevated temperatures.

5. A printing ink comprising a pigment and a vehicle therefor, the vehicle consisting essentially of a mixture of non-resinous, thermo-setting liquid condensates of phenolic compounds from the class consisting of monohydroxy benzene and its carbon alkylated products with formaldehyde having a resin dispersed therein, said liquid vehicle maintaining its liquidity and chemical composition on standing at normal temperatures, but resinifying into a solid resin when heated to elevated temperatures.

6. A printing ink comprising a pigment and a vehicle therefor, the vehicle being a non-resinous, thermo-setting liquid condensate of a phenolic compound from the class consisting of monohydroxy benzene and its carbon alkylated products with formaldehyde admixed with a polyhydric alcohol, said liquid vehicle maintaining its liquidity and chemical composition on standing at normal temperatures, but resinifying into a solid resin when heated to elevated temperatures.

7. A printing ink comprising a pigment and a vehicle therefor, the vehicle being a mixture of non-resinous, thermo-setting liquid condensates of phenolic compounds from the class consisting of monohydroxy benzene and its carbon alkylated products with formaldehyde admixed with a polyhydric alcohol, said liquid maintaining its liquidity and chemical composition on standing at normal temperatures, but resinifying into a solid resin when heated to elevated temperatures.

8. A printing ink comprising a pigment and a vehicle therefor, the vehicle being a non-resinous, thermo-setting liquid condensate of a phenolic compound from the class consisting of monohydroxy benzene and its carbon alkylated products with formaldehyde having a resin dispersed therein and containing a polyhydric alcohol, said liquid vehicle maintaining its liquidity and chemical composition on standing at normal temperatures, but resinifying into a solid resin when heated to elevated temperatures.

9. A printing ink comprising a pigment and a vehicle therefor, the vehicle being a mixture of non-resinous, thermo-setting liquid condensates of phenolic compounds from the class consisting of monohydroxy benzene and its carbon alkylated products with formaldehyde having a resin dispersed therein and containing a polyhydric alcohol, said liquid vehicle maintaining its liquidity and chemical composition on standing at normal temperatures, but resinifying into a solid resin when heated to elevated temperatures.

10. A printing ink comprising from 10 to 66 parts by weight of pigment and 34 to 90 parts by weight of a vehicle therefor having a viscosity approximately between 200 and 20,000 centipoises at 30° C., the vehicle consisting essentially of a non-resinous, thermo-setting liquid condensate of a phenolic compound from the class consisting of monohydroxy benzene and its carbon alkylated products with formaldehyde, said liquid vehicle maintaining its liquidity and chemical composition on standing at normal temperatures, but resinifying into a solid resin when heated to elevated temperatures.

JOHN W. KROEGER.
HARRY F. O'CONNOR.